3,575,846
CATALYSTS FOR THE SELECTIVE CONVERSION OF STRAIGHT-CHAIN HYDROCARBONS
Glen Porter Hamner, Baton Rouge, and Ralph Burgess Mason, Denham Springs, La., assignors to Esso Research and Engineering Company
No Drawing. Filed Sept. 14, 1967, Ser. No. 667,660
Int. Cl. C10g *13/02*
U.S. Cl. 208—111               27 Claims

ABSTRACT OF THE DISCLOSURE

Improved catalysts for the selective conversion of straight-chain hydrocarbons contained in a hydrocarbon feed comprise a crystalline alumino-silicate zeolite of the erionite variety having a low potassium content. Preferably, the low-potassium erionite is combined with a metallic hydrogenation component and used in the selective conversion of low octane-producing normal paraffins to upgrade the hydrocarbon feedstock. The process is preferably conducted in the presence of added hydrogen at elevated temperatures and pressures.

BACKGROUND OF THE INVENTION

Field of the invention

This invention relates to the removal of straight-chain hydrocarbons from hydrocarbon feedstocks containing same in combination with non-straight-chain hydrocarbons. More particularly, it relates to the use of an improved catalyst for this purpose, which catalyst comprises a crystalline alumino-silicate zeolite of the erionite variety. Still more particularly, it relates to a selective hydrocracking process accomplished in the presence of an erionite catalyst having a low potassium content and combined with a metallic hydrogenation component, said process being conducted with the imposition of a substantial hydrogen pressure. In its most preferred aspects, the invention relates to the octane improvement of naphtha feeds using the above-described process, particularly in connection with conventional reforming operations wherein the aforedescribed catalyst can be used either before, during or after the reforming operation so as to remove the low octane-producing straight-chain components of the petroleum-derived feed and/or product.

Description of the prior art

Hydrocarbon conversion and upgrading with crystalline alumino-silicate zeolite catalysts are now well known in the art. The use of these materials for such purposes as hydrocracking has been generally directed to typical petroleum-derived feedstocks such as gas oils, etc., which are customarily converted to lower boiling products useful as gasoline. The crystalline zeolites employed for such purposes usually have uniform pore openings of about 6 to 15 angstroms and are therefore non-selective; that is, substantially all of the feed molecules are admitted into the zeolite pore structure and converted. For many purposes selective hydrocracking of particular molecular species in the feed to the substantial exclusion of others is desired. For example, octane improvement of naphtha fractions can be accomplished by selectively hydrocracking only the straight-chain hydrocarbons (e.g., olefins, paraffins, etc.) which tend to be low octane-producing, thereafter removing the hydrocracked products, and finally recovering a higher octane product. Selective hydrocracking of straight-chain hydrocarbons contained in lube oil or gas oil fractions is also valuable for the purpose of pour point reduction or dewaxing.

The use of a non-selective large pore (e.g. 6 to 15 angstroms) crystalline zeolite for such purposes is largely ineffectual, as the desired feed molecules (e.g. aromatics) are admitted into the zeolite pores and converted together with the straight-chain hydrocarbons. It has now been found that a specific variety of a small pore size zeolite provides a valuable and unique catalyst component for the selective hydrocracking of straight-chain hydrocarbons. This variety is defined herein as an "erionite" type of crystalline zeolite.

Erionite per se is a naturally-occurring zeolite having elliptical pore openings of about 4.7 to 5.2 angstroms on its major axis. The synthetic counterpart has been designated in the art as "Zeolite T" in U.S. Pat. No. 2,950,952, and is characterized by a stoichiometric composition, in terms of mole ratios of oxides, as follows:

$$1.1 \pm 0.4[x\text{Na}_2\text{O}:(1-x)\text{K}_2\text{O}]:\text{Al}_2\text{O}_3:6.9 \pm 0.5 \text{SiO}_2:y\text{H}_2\text{O}$$

wherein $x$ is any value from about 0.1 to about 0.8, and $y$ is any value from about 0 to about 8. The latter patent further discloses typical X-ray diffraction patterns possessed by Zeolite T. Throughout this specification and claims the term "erionite" is intended to include both the naturally-occurring mineral and its synthetic counterparts.

SUMMARY OF THE INVENTION

The catalytic ability of erionite to selectively convert straight-chain hydrocarbons contained in admixture with non-straight-chain hydrocarbons is remarkably improved when the potassium content of the erionite is below about 4 wt. percent, preferably below about 3.5 wt. percent, more preferably below about 2.6 wt. percent, and most preferably below about 1.5 wt. percent. Prior to potassium removal, the natural mineral form of erionite usually has a potassium content in the range of about 2.5 to 8 wt. percent and the synthetic form usually in the range of about 6 to 10 wt. percent. Conventional means for reducing the potassium content such as by ion exchange with a replacing cation will ordinarily only be sufficient to reduce the potassium content by about 30%, e.g. down to a level of about 4 to 6 wt. percent potassium. In accordance with the present invention, various means are provided for further reduction of the potassium content down to the requisite levels prescribed herein. This additional potassium removal has the surprising effect of increasing the selective conversion ability of the erionite material so as to remarkably enhance its utility as a catalyst for the selective conversion of straight-chain hydrocarbons. The catalysts of the invention will find their highest utility in the process of selectively hydrocracking straight-chain components in a hydrocarbon feedstock, particularly a naphtha feedstock, either prior to or subsequent to conventional reforming operations.

The starting materials for the preparation of the catalysts of the invention will either be the natural or synthetic form of erionite. As mentioned, the synthetic form of erionite has been designated Zeolite T in U.S. Pat. 2,950,952, which contains full details as to composition and method of preparation. The naturally occurring mineral erionite has approximately the same composition and may be characterized by the following X-ray diffraction pattern.

X-RAY DIFFRACTION PATTERN FOR NATURAL ERIONITE

| kkl | Natural erionite [1] | |
|---|---|---|
| | d | $I/I_1$ |
| 100 | 11.46 | 100 |
| 101 | 9.14 | 8.5 |
| 002 | 7.55 | 7.8 |
| 110 | 6.61 | 40.6 |
| 102 | 6.30 | 4.9 |
| 200 | 5.72 | 5.3 |
| 201 | 5.35 | 6.9 |
| 103 | 4.61 | 4.1 |
| 202 | 4.56 | 5.8 |
| 210 | 4.33 | 24.8 |
| 211 | 4.16 | 10.9 |
| 300 | 3.81 | 14.2 |
| 212 | 3.75 | 40.4 |
| 104 | 3.58 | 21.3 |
| 302 | 3.40 | 0.7 |
| 220 | 3.30 | 16.6 |
| 213 | 3.28 | 6.2 |
| 310 | 3.171 | 6.6 |
| 204 | 3.145 | 12.6 |
| 311 | 3.104 | 3.3 |
| 312 | 2.921 | 6.5 |
| 400 | 2.857 | 26.8 |
| 214 | 2.839 | 21.0 |
| 401 | 2.809 | 21.8 |
| 402 | 2.673 | 7.3 |
| 006 | 2.512 | 1.3 |
| 410 | 2.495 | 5.6 |
| 322, 215 | 2.477 | 8.8 |
| 330 | 2.200 | 4.3 |
| 332 | 2.113 | 3.2 |
| 306 | 2.096 | 1.2 |
| 422 | 2.078 | 2.8 |
| 512 | 1.982 | 2.7 |
| 504 | 1.955 | 1.8 |
| 008 | 1.883 | 7.1 |

[1] Jersey Valley erionite supplied by Nevada Bureau of Mines.

The natural or synthetic form of erionite is then treated to remove a substantial proportion of its original potassium content so as to reduce the potassium level to the aforementioned ranges. This may be accomplished by various means. Two of the most convenient means involve either the use of high temperatures in the ion exchange with a suitable solution containing a replacement cation, or multiple exchanges with two or more different types of replacement cations which has the effect of reducing the potassium ion content to a greater degree than possible through the use of only one replacement cation.

Firstly, it has been found that conventional ion exchange with certain cation solutions at high temperatures will accomplish the desired degree of potassium reduction. In this connection it will be necessary to conduct the ion exchange at temperatures in the range of about 150 to 300° F., preferably 180 to 225° F., and it will be further necessary to conduct multiple exchanges with the cationic solution. Generally, at least 2 exchanges and preferably 3 exchanges will be required to achieve the desired degree of reduction. In addition to the temperature at which the exchanges are conducted, it has been found that the type of cation and anion present in the exchange solution will have an effect on the degree of reduction attainable. Suitable cations will include hydrogen, ammonium, sodium, magnesium, zinc, and calcium cations. Suitable anions will include nitrate, sulfate, chloride and acetate anions. Of these, combinations of (1) hydrogen cation with either the nitrate, chloride or sulfate anions (acid solutions); and (2) ammonium cation with one of the aforementioned anions are considered most effective in reducing the potassium content. With these acidic solutions, concentrations should be maintained at low levels to prevent deterioration of the crystal structure. Thus, for example, with solutions of hydrochloric and nitric acid the solution is maintained at less than 1 normal. While some replacement of potassium with the metallic cations does occur, it is to a lesser degree than with the hydrogen or ammonium cations. Replacement of potassium ions with sodium cations will not usually be suitable for most catalytic operations.

The second means for reducing the potassium content to the desired ranges involves the use of multiple cation exchange at ambient temperature using hydrogen-containing cation solutions and metal cation-containing solutions. By initial exchange of the erionite with hydrogen-containing cations followed by exchange with metal cations, the low potassium levels can be achieved. In this multiple ion exchange treatment the erionite will preferably be first treated under highly acidic conditions, e.g. a pH of 1–5 with an acid or a solution of a salt of a weak base and a strong acid. Ammonium salts of hydrochloric nitric, and sulfuric acid are particularly suited for this purpose. The initial hydrogen and/or ammonium ion exchange will usually be sufficient to reduce the potassium content by about 40 to 60%, i.e. down to potassium levels of about 2 to 3.5 wt. percent of the erionite. Following this initial ammonium or hydrogen ion treatment, further reduction in potassium content is accomplished by exchange with a metallic cation. Typical metallic cations will include cations of metals in Groups I-A, I-B, II-A, II-B, VII-B and VIII, particularly I-B, II-B, and VIII and most particularly metals in Group II-B of the Periodic Table, e.g. zinc and cadmium. This second ion exchange treatment will usually be sufficient to further reduce the potassium content by about 50 to 90%, i.e. down to levels of about 0.5 to 3.0 wt. percent of the erionite. For those catalysts suitable for use in hydroforming reactions, a preferred method will consist of an initial ammonium ion exchange followed by exchange with a Group II-A metal cation, e.g. to introduce calcium or magnesium. This will usually result in a mixed metal ion-hydrogen containing ion erionite. The hydrogen ion content can be further increased by back exchange with ammonium ion.

A final minor reduction in potassium content is achieved by incorporation of a hydrogenation component. This last step reduction in potassium is comparatively small. In the case of those catalysts prepared by use of ammonia complexes and ammoniacal solutions of metals such as platinum group metals, this final increment removal may be considered as an additional ammonium ion exchange; although at the dilutions usually employed it is essentially an additional wash step serving to remove the potassium ions displaced by the metal ion exchange.

The exchanges involve contact of the erionite, with stirring, with aqueous solutions containing the exchanging ion in concentrations ranging from about 5 to 30 wt. percent concentration, preferably 10 to 25 wt. percent concentration for periods ranging from 1 to 30 hours, preferably 2 to 6 hours. The preferred exchange technique involves suspension of the erionite in water and addition of a concentrated solution thereto with good agitation so that the resultant concentration of the exchange ion falls within preferred ranges. Following the exchange and removal of the contacting solution by filtration the cake is water washed by suspension, with good agitation in typical porportions of about 1 to 10 parts by weight of water for typical periods of 0.5 to 2, e.g. about one hour. In the case of ammonium and zinc ion exchanges (moderately acidic solutions) it is desired that all contact with treating solution and washes be at ambient temperature to avoid losses of crystallization. The catalysts discussed subsequently and prepared by multiple ion exchanges were water washed one time after each exchange and three times after the last exchange.

As a further step in the preparation of the catalysts of the invention, the catalyst is preferably combined with an active metallic hydrogenation component which may be chosen from Groups V–B, VI–B, VII–B or VIII of the Periodic Table and which is suitably exemplified by the metals cobalt, nickel, platinum, palladium, molybdenum, tungsten, etc. The hydrogenation component may be in the form of the free metal as in the case of platinum group metals, or as the oxide or sulfide as in the case of cobalt, etc., or mixtures of such metals, oxides or sulfides. Platinum group metals (i.e. metals of the platinum and palladium series) will be preferred for purposes of the present invention, with palladium being particularly preferred. Incorporation of the hydrogenation component may be accomplished by any conventional technique such as ion-exchange followed by reduction, impregnation, etc. When palladium is employed, the erionite is preferably impregnated with an ammoniacal solution a palladium chloride sufficient to produce the desired amount of hydrogenation metal in the final product, and then dried and calcined at a temperature of 800 to 1000° F. Reduction of the metal is then accomplished either separately or in the hydrocracking reaction per se. The amount of hydrogenation component may range from about 0.1 to about 25 wt. percent, preferably about 2 to about 10 wt. percent, based on the weight of final product. In the case of platinum group metals, e.g. palladium, the preferred amount will be in the range of about 0.1 to 6, e.g. 0.5 to 3 wt. percent based on dry catalyst.

It has been further found that the activity and effectivenes of certain catalysts used herein may be substantially improved by contact with sulfur prior to or during their use in the selective hydrocracking process. Specifically, those catalysts of the invention wherein the erionite has been exchanged with Group II–B metal cations, are particularly susceptible to improvement via sulfactivation. The catalyst is preferably sulfactivated in these instances to enhance its activity by contact either with a sulfur-containing feed or, if the feed has a low sulfur content, with hydrogen sulfide or an added sulfur compound which is readily convertible to hydrogen sulfide at the hydro conditions employed, e.g. carbon disulfide, etc. The extent of this sulfactivation treatment should be sufficient to incorporate 0.5 to 15 wt. percent sulfur into the catalyst.

The feed stocks utilized in the present invention will generally include mixtures of hydrocarbons and particularly petroleum distillates falling within the approximate range of about 80° to about 750° F., which range will include naphthas, gasolines, kerosenes, gas oils, middle distillates, etc. Preferably, the feed will be predominantly naphtha-containing and may consist of either low boiling or high boiling naphthas. Typical low boiling feeds will have boiling ranges of about 50° to 250° F., preferably 75° to 180° F., whereas typical heavy naphtha feeds will boil within the range of about 350° to 450° F., preferably 375° to 430° F. Examples of such feed stocks, both low boiling and high boiling, are virgin naphtha fractions such as $C_5$–$C_6$ naphtha, heavy virgin naphtha, heavy coker naphtha, heavy steam cracked naphtha, heavy catalytic naphtha, etc. Particularly preferred feed stocks will include the light naphthas as described above, naphthas suitable as hydroformer feeds and naphtha products from the hydroforming operation, which feeds will typically boil in the range of about 50° to 400° F., preferably 80° to 350° F. A prime hydroformer feed will have about a 180° to 360° F. boiling range. A requirement for the feed stocks used in the present invention is that they contain a substantial quantity of straight chain hydrocarbons which are converted or removed in accordance with the present invention.

The above feed stocks are treated with the aforedescribed erionite catalysts in either fixed bed, moving bed, or fluidized solids operation, either upflow or downflow (in bed reactors), at the following operating conditions:

|  | Generally preferred | Particularly preferred |
|---|---|---|
| Temperature, ° F | 650–1,000 | 700–850 |
| Pressure, p.s.i.g | 100–2,000 | 200–1,000 |
| Space velocity, v./v./hr | [1] 0.25–5 | [1] 0.5–2 |
|  | [2] 0.5–40 | [2] 4–20 |
| Hydrogen rate, s.c.f./b | 500–10,000 | 1,000–4,000 |

[1] Naphthas of 50–200° F. boiling range.
[2] Naphthas in 180–430° F. boiling range usable in hydroforming operations.

The essence of the present invention, namely the use of the aforedescribed catalysts for the selective removal of straight chain hydrocarbons, can be utilized in various processing schemes depending upon the results desired. These various processing schemes will now be described in some detail as they represent specific embodiments of the present invention.

The catalysts of the invention can conveniently be used to upgrade naphtha fractions for inclusion in the high quality motor gasoline pools. This may involve a single stage operation wherein the naphtha feed is introduced into contact with the erionite catalyst at the aforedescribed conditions and the resulting product has a greatly enhanced octane number.

The erionite catalyst of the invention can be utilized to upgrade previously hydrocracked feed stocks, e.g. an additional hydrocracking stage containing the erionite catalyst can be used in conjunction with a conventional hydrocracking operation in order to produce higher octane product. The conventional hydrocracking stages are conducted with any of the various available hydrocracking catalysts and most preferably with the newly developed relatively large pore (e.g. 6 to 15 angstrom units) crystalline alumino-silicate zeolite catalysts containing metallic hydrogenation components. Such catalysts have been extensively described in the recent prior art, e.g. U.S. 2,971,904 and U.S. 3,287,252. In this embodiment the total hydrocracked product from the relatively large pore size zeolite catalysts, or a selected portion thereof, may be contacted with the selective erionite catalyst of the invention. Intermediate fractionation and segregation of desired fractions can be used. Typical hydrocracking conditions with the large pore zeolite catalysts will include temperatures from about 400° to 800° F., pressures of about 250 to 2500 p.s.i.g., liquid hourly space velocities of about 0.2 to 2 v./v./hr. and hydrogen rates of about 1000 to 20,000 s.c.f./b.

The erionite catalysts of the invention can be used in conjunction with conventional hydroforming operations. In this case the erionite catalysts can be used either in a lead reactor to pretreat the feed passing to the hydroforming reactors, or can be utilized either in a separate tail reactor or in a bottom portion of the last hydroformer of the train, to selectively convert remaining straight chain hydrocarbons so as to further increase the octane number of the hydroformed product. The erionite catalyst can also be utilized in admixture with conventional hydroforming catalysts in one or more conventional hydroforming reactors.

"Hydroforming" operations are well known in the art and involve treatment of hydrocarbon fractions boiling in the motor fuel or naphtha range at elevated temperatures and pressures in the presence of certain solid catalysts and hydrogen. Hydroforming usually consists of treating hydrocarbon vapors in the presence of hydrogen or a hydrogen-rich gas at typical temperatures of 750° to 1150° F. and pressures of 50 to 1000 p.s.i.g. with catalysts such as the oxides or sulfides of metals of Groups IV, V, VI, VII and VIII of the Periodic Table, either alone or preferably supported on suitable relatively large pore size base such as alumina gel, precipitated alumina, zinc alumina, silica alumina, etc. Typical hydroforming catalysts include the oxide Group VI metals such as molybdenum, chromium, the metals of the palladium series such as platinum, palladium, etc. deposited on a suitable support such as silica-alumina, or components thereof. These catalysts may contain varying amounts of halogen, boria, or other components designed to enhance their activity or selectivity. A particularly suitable catalyst of the art comprises platinum (e.g. 0.02 to 2.0 wt. percent) on alumina containing a minor amount (e.g. 0.1 to 0.5 wt. percent) of a chloride or fluoride.

The hydroformed product stream (hydroformate) from a typical hydroforming operation will usually contain a substantial portion (e.g. 1 to 15 wt. percent) of normal paraffinic hydrocarbons having an undesirably low octane rating. As such, hydroformate streams represent excellent candidates for upgrading by means of the present invention with the low potassium erionite catalyst. This is accomplished by contacting reformed naphtha stream in the presence of gaseous hydrogen which may be either separately added or, more preferably, included in the reformer gas with a catalyst of the type hereinbefore described. The result of such treatment is to selectively convert the normal paraffinic components to lower boiling saturated products which can be readily recovered, thus leaving a naphtha product of greatly enhanced quality. A number of conventional hydroforming stages can be employed prior to the final treatment with the catalyst of the invention. Moreover, the entire hydroformate can be subjected to the erionite catalyst or a selected portion thereof can be thus treated. Further, a selective fraction of the hydroformate can be separated by, for example, fractionation, said fraction containing a high proportion of the undesirable straight chain hydrocarbons, and this fraction separately contacted with the erionite catalysts so as to upgrade it followed by blending back with the remainder of the hydroformate to achieve an overall increase in octane rating without necessity for subjecting the entire hydroformate to the erionite catalyst.

As mentioned, it is additionally contemplated to pretreat a typical hydroformer feed stock, such as a virgin naphtha, prior to its contact with the conventional hydroforming catalysts of the art. The selective conversion of the undesirable straight chain component in the feed leaves the desirable naphthenic and aromatic portions essentially unchanged. In the hydroforming zones per se, less carbon formation will be encountered. Subsequent to the pretreatment stage, any number of conventional hydroforming stages can be employed. The hydroformate produced may be blended with a high octane $C_4$ and $C_5$ products from the pretreatment zone separated in a fractionation zone to thereby obtain maximum yield of high octane products. Further, the hydroformate itself can be separated by fractionation with subsequent recovery and blending of the higher octane fractions for particular uses or purposes.

As mentioned, in addition to the posttreatment and pretreatment of hydroformer feed stocks and products as just described, it is further contemplated that the erionite catalyst can be uniformly admixed with the conventional hydroforming catalysts to achieve the desirable results herein described. These include conversion of normal paraffins to gaseous hydrocarbons simultaneously with the dehydrogenation reactions to produce aromatics. The aromatics so produced are predominantly benzene and toluene because of the dealkylation properties of the erionite in the reformer reactors. Thus, upon commingling the conventional hydroformer catalyst and the erionite catalyst, there results a product predominantly comprised of lower boiling aromatics and which is essentially normal paraffin free. These improvements are reflected in a higher octane number naphtha. The products boiling lower than the desired naphtha range, e.g. $C_4$, are removed by distillation.

Finally, as also mentioned, it is further contemplated that the tail reactor of a conventional hydroforming operation contain erionite catalyst in the last increment of reactor space as distinguished from an entirely separate reactor.

DESCRIPTION OF THE PREFERRED EMBODIMENTS

Example 1

This example illustrates the preparation and use of the catalysts of the invention comprising crystalline aluminosilicate zeolites of the erionite variety combined with metallic hydrogenation components. The erionite catalyst utilized in this example was prepared from the natural mineral erionite and used for the selective hydrocracking of a $C_5$–$C_6$ naphtha fraction derived from an Arabian crude. The naphtha feed had a gravity of 85.4° API and a boiling range of about 150 to 193° F. (98% overhead).

In order to demonstrate the effect of decreasing potassium content in the erionite component on the ability of the catalyst to convert straight chain hydrocarbons, a series of four samples was prepared, using ion exchange procedures at ambient temperature.

Catalyst A was prepared by exchanging a 500 gram sample suspended in 2000 grams of water with a 47.5 wt. percent zinc chloride solution so that the composition resulted in a ratio of 6 grams of 15.4% zinc chloride solution per gram of erionite. A series of three exchanges was performed with intermediate filtration and final washing with water. As a result of these exchanges the potassium content in the erionite sample was reduced from 6.5 wt percent to 4.1 wt. percent by replacement with zinc cation.

Catalyst B was prepared from a sample of erionite but exchanged with ammonium chloride instead of zinc chloride using a 15.4 wt. percent ammonium chloride solution in a ratio of about 6 grams of solution per gram of erionite. The procedure was similar to that described above except that in this case the total number of exchanges was four, which served to reduce the potassium content to 3.7 wt. percent.

Catalyst C was prepared similarly to catalyst A using a different mineral sample and the total number of exchanges was three. This served to reduce the potassium content to a level of 3.2 wt. percent.

Catalyst D was prepared following the general procedure described above except that in this case a dual cation exchange was performed which involved first exchanging the erionite with ammonium chloride followed by zinc exchange. In this case the ratios and concentrations of solutions were the same as described above and the total number of ammonium chloride exchanges was three and the total number of zinc chloride exchanges was also three, with the net result being that the potassium content of the erionite was reduced to 1.3 wt. percent. Upon incorporation of palladium, the potassium level was further reduced to 1.1%.

Catalysts A, B, C, and D were treated to incorporate palladium into the catalyst product. This was accomplished by suspending the wet cake product from the original 500 gram charge of erionite in 1000 parts of water and, with agitation, adding 68 cc. of palladous ammonium chloride containing 37.5 mg. Pd/cc. thereto. Agitation was continued for one hour at room temperature. After filtering, washing and drying, the various catalysts contained 0.5–0.6 wt. percent palladium. The catalysts were then pelletized for use in a fixed bed test unit, downflow operation, using the above Arabian $C_5$–$C_6$ naphtha. Prior to contact with the fresh naphtha feed, the catalysts were sulfactivated by initial pretreatment with the same feed containing added 1 wt. percent carbon disulfide for a period of about seven hours at a space velocity of about 0.5 v./v./hr. which pretreatment was sufficient to incorporate about 2.5 wt. percent sulfur into the catalyst.

The above palladium-containing erionite catalysts were used in the selective hydrocracking of the naphtha feed at 500 p.s.i.g., 0.5 v./v./hr., 2000 cf./b. exit hydrogen rate. The results of these tests are summarized in the following table at the temperature levels indicated.

TABLE I.—SELECTIVE HYDROCRACKING OF ARABIAN $C_5$-$C_6$ NAPHTHA WITH PALLADIUM ERIONITE

[500 p.s.i.g.; 2,000 c.f./b. exit $H_2$ rate; 0.5 v./v./hr.]

| Erionite catalyst | | A | | B | | C | | D | |
|---|---|---|---|---|---|---|---|---|---|
| Predominant cation | | Zn | | H | | Zn | | Zn | |
| Potassium content | | 4.1 | | 3.7 | | 3.2 | | 1.1 | |
| | | Temperature, °F. | | | | | | | |
| | Feed | 850 | 750 | 750 | 700 | 850 | 750 | 850 | 750 |
| Product distribution, wt. percent: | | | | | | | | | |
| $C_4$ and lighter | 0 | 41.8 | 20.9 | 41.5 | 36.4 | 62.3 | 49.2 | 67.7 | 59.2 |
| n-$C_5$ | 17.0 | 10.7 | 14.2 | 10.2 | 12.7 | 1.7 | 5.4 | 0.0 | 0.6 |
| n-$C_6$ | 35.1 | 5.3 | 14.1 | 2.6 | 4.4 | 0.7 | 2.5 | 0.0 | 0.0 |
| Conversion of n-$C_5$, percent | | 37 | 17 | 40 | 25 | 90 | 68 | 100 | 96 |
| Conversion of n-$C_6$, percent | | 85 | 60 | 95 | 88 | 98 | 93 | 100 | 100 |

As indicated by the above data, the low potassium erionite catalysts of the invention represent substantially improved catalysts for the selective conversion of normal paraffins.

Although catalysts A and B are from one erionite source and catalysts C and D from another source, it is readily observed that a decrease in the potassium content is directly proportional to increase in the wt. percent of normal $C_5$ and normal $C_6$ components removed by selective conversion. Thus, for example, at a constant temperature of 750° F., catalysts A, B, C, and D converted 17%, 40%, 68% and 96% of the normal-$C_5$ components respectively. Similar effects are observed at the 850° F. temperature level. It may thus be concluded that lowering of the potassium content of the erionite catalysts results in a dramatic improvement in catalytic performance as regards the conversion of the undesirable straight chain hydrocarbons. Evaluation of the above catalysts is made on the basis of the extent of conversion of the n-$C_5$ and n-$Cr_6$ components. Directly associated with the improved performance is the lower potassium content, i.e. catalyst D being the best catalyst and having the lowest potassium content (1.1 wt. percent). In the above tabulation it is recognized that the erionite of catalysts A and B is not as amenable to ion exchange as that of catalysts C and D. This is confirmed by comparison of the performance of catalysts A and C which were similarly prepared.

It is further observed, e.g. from catalyst B's experience that conventional metal ion exchange procedures at relatively low temperature are not adequate to reduce the potassium levels to the desired values. Thus, the catalysts of the invention can be further characterized as containing an erionite having a potassium content lower than that obtained by conventional metallic cation exchange procedures (e.g. zinc cation exchange) at relatively low temperatures. By "relatively low temperatures" is meant temperatures below 150° F. at which the crystallinity of the erionite is not deleteriously affected.

Example 2

This example demonstrates the preparation and use of catalysts of the invention based upon the synthetic variety of erionite. This material was prepared by combining sodium hydroxide, potassium hydroxide, alumina trihydrate and water and an aqueous colloidal silica sol, with the proportions of each ingredient being determined by the following molar ratios: $SiO_2/Al_2O_3$—20;

$(Na_2O+K_2O)/SiO_2$—0.36; $K_2O/(Na_2O+K_2O)$—0.25

$H_2O/SiO_2$—12. A mixture of the latter ingredients was heated to a temperature of about 212°–214° F. and held at said temperature for a period of about 29 days at which point the crystallization reaction was terminated by quenching with cold water and the product separated by filtration, water washed, and finally dried. The product had the following approximate molar formula:

$1.0 \pm 0.1[(0.27)Na_2O:(0.73)K_2O]:Al_2O_3:6.97 \pm 1.0SiO_2$ and the following typical X-ray diffraction pattern after ion exchange (using copper $K\alpha$ doublet radiation):

| Ammonium ion exchanged | | | Zinc ion exchanged | | |
|---|---|---|---|---|---|
| 2θ | α | Relative Intensity | 2θ | α | Relative Intensity |
| 7.75 | 11.43 | Very strong. | 7.75 | 11.43 | Very strong. |
| 13.42 | 6.60 | Strong. | 13.41 | 6.60 | Moderately strong. |
| 20.5 | 4.34 | Moderately strong. | 20.5 | 4.34 | Strong. |
| 23.75 | 3.75 | Strong. | 23.75 | 3.75 | Moderately strong. |

The above synthetic erionite product was formed into catalysts E and F. Catalyst E was prepared by exchanging the synthetic erionite with zinc chloride solution in accordance with the procedure described in Example 1.

Catalyst F was exchanged with ammonium chloride solution and subsequently with zinc chloride solution in accordance with the procedure used for catalyst D excepting that four ammonium chloride exchanges were employed instead of three. The final catalysts E and F were prepared by incorporation of the palladium hydrogenation component following the procedures described in Example 1 so as to incorporate about 0.5–0.6 wt. percent. Catalyst E had a reduced potassium content of 5.9 wt. percent as compared with the original 9.3 wt. percent in the synthetic erionite before ion exchange, whereas catalyst F which involved the double ion exchange procedure had a potassium content of 2.5 wt. percent.

Catalysts E and F were used for the selective conversion of the Arabian $C_5$–$C_6$ naphtha of Example 1 at the same operating conditions and a temperature of 750° F. The results are shown in the following table:

TABLE II.—SELECTIVE HYDROCRACKING OF ARABIAN $C_5$-$C_6$ NAPHTHA WITH PALLADIUM ERIONITE

[500 p.s.i.g.; 2,000 c.f./b. exit $H_2$ rate; 0.5 v./v./hr.]

| Erionite catalyst | | E | F |
|---|---|---|---|
| Predominant cation | | Zn | Zn |
| Potassium content | | 5.9 | 2.5 |
| | | Temperature, °F. | |
| | Feed | 750 | 750 |
| Product distribution, wt. percent: | | | |
| $C_4$ and lighter | 0 | 38.2 | 61.0 |
| n-$C_5$ | 17.0 | 11.0 | 1.2 |
| n-$C_6$ | 35.1 | 7.6 | 0.1 |
| Conversion n-$C_5$, percent | | 35 | 93 |
| Conversion n-$C_6$, percent | | 78 | 100 |

The above results clearly demonstrate that reduction of the potassium content of the synthetic erionite catalysts results in substantially improved selective conversion ability. Thus, conversion of normal $C_5$ components increased from 35 to 93%, and conversion of normal $C_6$ components increased from 78 to 100%, by the expedient of removing additional potassium.

Example 3

The foregoing data have demonstrated the activity feature of the low potassium, double exchanged erionite. Results discussed in the present example illustrate a superior selectivity feature of the low potassium zinc-containing erionite as compared with the hydrogen form, which when prepared from the synthetic material has good activity at a relatively high potassium content. For this work catalyst G was prepared from the same synthetic erionite production as was used in catalysts E and F. The same preparation procedures were followed as in catalyst B which involved a threefold exchange with ammonium chloride and addition of palladium after water washing. Excepting for the threefold ammonium ion exchange instead of four, catalyst G corresponds to catalyst F without the zinc component. The catalyst, after sulfur activation, was tested with the Arabian $C_5$–$C_6$ naphtha. Comparison of catalysts F (low potassium, metallic-ion containing) and G (low potassium, hydrogen-ion containing) is given in Table III.

TABLE III.—SELECTIVE HYDROCRACKING OF ARABIAN $C_5$–$C_6$ NAPHTHA WITH PALLADIUM ERIONITE

[500 p.s.i.g.; 2,000 c.f./b. exit $H_2$ rate; 0.5 v./v./hr.]

| Erionite catalyst | | F | G |
|---|---|---|---|
| Predominant cation | | Zn | H |
| Potassium content, wt. percent | | 2.5 | 3.7 |
| | | Temperature, °F. | |
| Product distribution, wt. percent: | Feed | 750 | 750 |
| $C_4$ and lighter | 0 | 61.0 | 72.9 |
| n-$C_5$ | 17.0 | 1.2 | 0.9 |
| n-$C_6$ | 35.1 | 0.1 | 0.2 |
| Selectivity,* percent | | 83.5 | 70.0 |

*Selectivity=100×(n-$C_5$+n-$C_6$ converted)/$C_4$-produced.

Thus, at the same temperature and operating conditions and at essentially complete conversion of normal paraffins, the metallic-containing erionite catalyst F is considerably more selective resulting in less loss of branched paraffins, naphthenes, etc. to $C_4$-gas. The net result is higher yield of the desired nonnormal paraffin product.

Example 4

This sample demonstrates the ability of the catalyst of the invention to upgrade product issuing from conventional hydroforming operations. The erionite catalyst used was catalyst F of Example 2. This catalyst was used on a feed which was the product from a conventional hydroforming reactor having the inspections shown in the table below. This hydroformate product was obtained by subjecting a naphtha boiling in the range of 180°–375° F. with a commercial available platinum-alumina reforming catalyst containing 0.5 wt. percent platinum under reforming conditions which included a temperature of 920°–950° F., a pressure of 275 p.s.i.g., a space velocity of 2 v./v./hr. and a recycle gas rate of 6000 s.c.f./b. of feed; the hydrogen content of the recycle gas being 75%. The entire liquid product was then contacted with the erionite catalyst.

The selective upgrading of hydroformate in accordance with this embodiment of the invention are shown in the following table:

TABLE IV.—SELECTIVE HYDROCRACKING OF HYDROFORMATE-PALLADIUM ERIONITE CATALYSTS (0.5% Pd)

[500 p.s.i.g.; 8 v./v./hr.; 2,000 c.f./b. exit hydrogen rate]

| Erionite catalyst | | "F" | |
|---|---|---|---|
| Predominant cation | | ¹Zn | |
| Potassium content, wt. percent | | 2.5 | |
| | | Temperature, °F. | |
| Naphtha inspections | Feed | 725 | 775 |
| Vol. percent yield | | 94 | 94.9 |
| Gravity, °API | 39.8 | 38.9 | 38.8 |
| RON clear | 99.5 | 102 | 101.9 |
| RON plus 3 cc. TEL | 102.8 | 104.2 | 104.7 |
| MON clear | 88 | 91 | 90.8 |

¹ After exchange with $NH_4$ plus ion.

The above examples illustrate certain of the preferred embodiments of the invention. It is not, however, the intent to limit the scope of the above invention to the specific embodiments outlined above as various other modifications and embodiments will readily occur to those skilled in the art.

What is claimed is:

1. An improved process for selectively removing straight-chain hydrocarbons from a hydrocarbon feed which comprises selectively hydrocracking said feed by contact, at elevated temperature and pressure and in the presence of hydrogen, with a catalyst comprising a crystalline alumino-silicate zeolite of the erionite variety combined with a metalllic hydrogenation component, said zeolite having a potassium content less than about 4 wt. percent.

2. The process of claim 1, wherein said metal in said metallic hydrogenation component comprises a metal selected from the group consisting of metals in Groups V–B, VI–B, VII–B and VIII of the Periodic Table.

3. The process of claim 1, wherein said hydrogenation component comprises a platinum group metal.

4. The process of claim 1, wherein the potassium content of said zeolite is less than about 3.5 wt. percent.

5. The process of claim 1, wherein said zeolite has been base-exchanged with hydrogen-containing cations.

6. The process of claim 1, wherein said hydrocarbon feed is predominantly naphtha-containing.

7. The process of claim 1, wherein said feed comprises a hydroformed naphtha product stream.

8. An improved process for selectively removing straight-chain hydrocarbons from a hydrocarbon feed which comprises contacting said hydrocarbon feed, at elevated temperature and pressure and in the presence of hydrogen, with a catalyst comprising a metallic hydrogenation component combined with an alumino-silicate zeolite of the erionite variety, said zeolite having been cation exchanged at a temperature within the range of about 150–300° F.

9. The process of claim 8, wherein said zeolite has been cation-exchanged with both hydrogen-containing cations and metal cations.

10. The process of claim 8, wherein said zeolite has been cation-exchanged with Group II–B metal cations.

11. The process of claim 8, wherein the potassium content of said zeolite is less than about 2.6 wt. percent.

12. The process of claim 8, wherein the potassium content of said zeolite is less than about 1.5 wt. percent.

13. The process of claim 8, wherein said feed is a previously hydroformed stream.

14. The process of claim 8, wherein said feed is a previously hydrocracked stream.

15. A catalyst composition comprising a metallic hydrogenation component combined with a crystalline aluminosilicate zeolite of the erionite variety, said zeolite having a potassium content of less than about 4 wt. percent.

16. The composition of claim 15, wherein the potassium content is less than about 2.6 wt. percent.

17. The composition of claim 15, wherein the potassium content is less than about 1.5 wt. percent.

18. A process for the preparation of a crystalline aluminosilicate zeolite of the erionite variety having a potassium content less than about 4 wt. percent which comprises removal of the potassium ions present in said zeolite by ion exchange at temperatures in the range of about 150° to 350° F.

19. The process of claim 18 wherein said ion exchange is conducted at temperatures in the range of about 180° to 225° F.

20. The process of claim 18 wherein the final zeolite produced has a potassium content of less than about 2.6 wt. percent.

21. The process of claim 18 wherein the final zeolite produced has a potassium content of less than about 1.5 wt. percent.

22. The process of claim 18 wherein the exchange ions are selected from the group consisting of hydrogen, ammonium, sodium, magnesium, zinc and calcium ions.

23. A process for the preparation of a crystalline aluminosilicate zeolite of the erionite variety having a potassium content between about 0.5 and 3 wt. percent which comprises removal of the potassium ions present in said zeolite by multiple cation exchange of the zeolite material at ambient temperatures using both hydrogen-containing cation solutions and metal cation-containing solutions, and wherein said metal cations are selected from the cations of metals of Groups I-A, I-B, II-A, II-B, VII-B, and VIII of the Periodic Table.

24. The process of claim 23 wherein said hydrogen-containing cation comprises ammonium ions, and wherein said metal cation is selected from Group II-A of the Periodic Table.

25. The process of claim 23 wherein said multiple ion exchange further comprises additional exchange with ammonium ions following the exchange with metal ions.

26. A process for the preparation of a crystalline aluminosilicate zeolite of the erionite variety having a potassium content of less than about 4 wt. percent which comprises removal of the potassium ions present in said zeolite by the steps of (1) ion exchange of said zeolite at temperatures in the range of about 150° to 300° F. with ions selected from the group consisting of hydrogen, ammonium, sodium, magnesium, zinc, and calcium ions, and (2) multiple ion exchange at ambient temperatures using both hydrogen-containing cation solutions and metal-containing cation solutions, wherein said metal cations are selected from the cations of metals of Groups I-A, I-B, II-A, II-B, VII-B and VIII of the Periodic Table.

27. The process of claim 26 wherein said potassium content is further reduced by the incorporation of a hydrogenation component thereto, said hydrogenation component selected from Groups V-B, VI-B, VII-B and VIII of the Periodic Table.

References Cited
UNITED STATES PATENTS

| | | | |
|---|---|---|---|
| 2,950,952 | 8/1960 | Breck et al. | 23—113 |
| 3,039,953 | 6/1962 | Eng | 208—26 |
| 3,331,768 | 7/1967 | Mason et al. | 208—111 |
| 3,114,696 | 12/1963 | Weisz | 208—66 |
| 3,140,253 | 7/1964 | Plank et al. | 208—120 |
| 3,395,096 | 7/1968 | Gladrow et al. | 208—11 |

PAUL M. COUGHLAN, Jr., Primary Examiner

R. BRUSKIN, Assistant Examiner

U.S. Cl. X.R.
208—135; 252—455

Notice of Adverse Decision in Interference

In Interference No. 98,229 involving Patent No. 3,575,846, G. P. Hamner and R. B. Mason, CATALYSTS FOR THE SELECTIVE CONVERSION OF STRAIGHT-CHAIN HYDROCARBONS, final judgment adverse to the patentees was rendered Mar. 25, 1976, as to claim 13.

[*Official Gazette June 22, 1976.*]